United States Patent
Irvin

(10) Patent No.: US 6,195,568 B1
(45) Date of Patent: Feb. 27, 2001

(54) RADIOTELEPHONE ADAPTED TO THE IDENTITY OF ITS USER

(75) Inventor: David R. Irvin, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/028,569

(22) Filed: Feb. 24, 1998

(51) Int. Cl.$^7$ ....................................................... H04B 1/38
(52) U.S. Cl. ......................... 455/563; 455/410; 455/411; 379/551; 379/93.3; 379/903
(58) Field of Search ..................................... 455/563, 566, 455/564, 569, 418, 410, 411; 379/93.03, 93.26, 93.37, 82.2, 127, 903, 907; 364/479.07

(56) References Cited

U.S. PATENT DOCUMENTS

| | | |
|---|---|---|
| 4,905,304 | 2/1990 | Bardon et al. . |
| 4,907,274 | * 3/1990 | Nomura et al. .................. 379/100.11 |
| 5,161,184 | * 11/1992 | Smith et al. ........................... 379/413 |
| 5,371,779 | * 12/1994 | Kobayashi ............................ 455/563 |
| 5,465,401 | * 11/1995 | Thompson .............................. 455/89 |
| 5,675,630 | 10/1997 | Beatty . |
| 5,805,674 | * 9/1998 | Anderson, Jr. ....................... 379/93.3 |
| 5,842,124 | * 11/1998 | Kenagy et al. ....................... 455/418 |
| 5,909,652 | * 6/1999 | Ishikawa et al. ..................... 455/558 |
| 6,023,619 | * 2/2000 | Kaminsky ............................ 455/411 |

FOREIGN PATENT DOCUMENTS

| | | |
|---|---|---|
| 0730387A2 | 9/1996 | (EP) . |
| 2315954A | 7/1998 | (GB) . |
| WO 92/19078 | 1/1992 | (WO) . |
| WO 96/21327 | 7/1996 | (WO) . |

\* cited by examiner

*Primary Examiner*—Edward F. Urban
*Assistant Examiner*—Congvan Tran
(74) *Attorney, Agent, or Firm*—Coats & Bennett, PLLC

(57) ABSTRACT

A method and apparatus for automatically tailoring a communication device to suit the user's preferences based on the user's identity includes storing a plurality reference signatures and associated operational profiles. When a user supplies a proffered signature to the communication device, the proffered signature is compared to the stored reference signatures. If a match is found, the communication device is configured according to the operational profile associated with the matched reference signature. If no match is found, normal operation of the communication device is preferably inhibited. The proffered and reference signatures may be conventional manually entered passwords, spoken voice patterns, writing samples, fingerprints, and the like. The present invention allows a single apparatus to be used by a plurality of users under one service subscription and telephone number as well as under a plurality of subscriptions and telephone numbers.

30 Claims, 4 Drawing Sheets

RADIOTELEPHONE ADAPTED TO THE IDENTITY OF ITS USER

FIELD OF THE INVENTION

The present invention relates generally to communication devices, and more particularly to communication devices which adapt their operational characteristics to the identity of the user of the communication device.

BACKGROUND OF THE INVENTION

Wireless communication devices, such as cellular telephones, have proven very popular in the Untied States, as well as in other countries. The operating characteristics of such cellular telephones are often tailored to accommodate the habits of the cellular telephone's principal user. For example, a complex telephone that is capable of recognizing spoken commands may be trained to the speech patterns of a particular user. Once determined through training, the pattern-recognition parameters needed to interpret that user's speech are typically stored by the telephone in non-volatile memory. Because the telephone's speech recognition capability enables a vehicle's driver to operate the telephone with minimal distraction, such a telephone is convenient for use in an automobile and therefore increasingly important in the marketplace. Other cellular telephones might offer an internal telephone book or speed-dial list, which would be set to reflect the preferences and needs of a single user and, once set, are stored in nonvolatile memory.

In general, the two exemplar telephones mentioned above are responsive to the market for single-user cellular telephone terminals. Although the commercial success of cellular telephony speaks well for the utility of such designs, the single-user philosophy has clear disadvantages.

To clarify this point, consider circumstances wherein a cellular telephone is permanently integrated into an automobile, or wherein a telephone is used to provide a radio frequency (RF) link for a stationary or fixed cellular terminal such as a single-line terminal (SLT) or multi-line terminal (MLT) intended to serve a population of rural users, or wherein a handheld cellular telephone is shared among several users, for example among parents and children. In these circumstances, the limitations of the single-user approach become inconveniently evident: speech recognition parameters, speeddialers, telephone books, billing records, and other information tailored to a particular user and held in nonvolatile memory must be frequently reestablished and reentered as the telephone is used by different people.

In response to such limitations, cellular telephones that operate according to the GSM standard provide for the optional use of subscriber information module (SIM) cards. SIM cards, briefly put, enable cellular users to carry their identities from telephone to telephone. For example, PCT application WO 96/21327 shows the use of a SIM card to tailor the operation of a fixed cellular terminal. Inserting a SIM card into an SLT or MLT host tailors the billing and account information of that host to the identity of a particular user.

Although a SIM card provides useful options, the SIM card nevertheless has its own disadvantages. A user must remember to carry a SIM card from place to place in order to gain its benefits. This is both an inconvenience and a risk, as the user may be caught without a SIM card when it is needed, and the card itself may be lost. Moreover, the functions supported by current SIM cards are quite limited, and do not include, for example, the transfer of speech-recognition parameters.

Along a different vein, European Patent Application EP 0 730 387 A2 proposes the nonvolatile storage of a plurality of telephone books and a plurality of number address modules (NAM), so that a particular telephone book is associated with a particular NAM. With this invention, a given hand-held telephone can support multiple service subscriptions (NAMs), for example a business subscription and a personal subscription. A different telephone book is associated with each subscription, with the provision of re-associating the subscriptions and telephone books by keyboard-and-menu intervention. However, each telephone book is associated with a service subscription or telephone number rather than with the identity of a particular user of the telephone.

All told, the method of operation suggested by the above-named European Application is once again a reflection of the single-user philosophy—it does not provide conveniently tailored features for a telephone that is used by more than one person but served by a single subscription. For example, it does not well serve the needs of a family that shares an automobile with an integrated cellular telephone and a single service subscription that is used by a number of different drivers and passengers. In these circumstances, it is often desirable to have only one service subscription and telephone number associated with the automobile, in order to save the cost of multiple service subscriptions, or to economize by bundling minutes-of-use under one telephone number so as to enter a favorable region of a communications tariff, or to avoid the need to dial multiple numbers to reach the automobile when the exact identity of its driver is unknown to the calling party. Moreover, the functions supported by the above-named European Application are again quite limited, and do not explicitly include anything beyond the selection of telephone books.

It is further known to limit the access of communication devices to communications service by means of passwords. Typically, a password is a numerical sequence comprising at least four digits so as to minimize the likelihood that an unauthorized user might guess the proper sequence. To gain access, a prospective user enters a password by keyboard. This entry is compared with an earlier-entered password reference stored in the communication device's nonvolatile memory. If the entry and the reference match, the communication device grants access to the prospective user; otherwise, the prospective user remains locked out. Once the password is successfully entered, various options and subscriptions may be available to that user according to the methods proposed by the above-named European Patent Application. No privacy is accorded to these options by today's methods, however, once general access is granted. Moreover, the user must laboriously select the appropriate options from a list of possibilities by further manual intervention.

In view of the limitations of the approaches outlined above, there remains a need for a simple, convenient, transparent way of enabling a communication device to support the preferences of a multiplicity of end users while operating under one or more service subscriptions. More particularly, there remains a need for a way of identifying a particular end user of a communication device rather than the identity of a service subscription, and based on the user's identity, of automatically tailoring the communication device to suit the user's preferences, all the while preserving the freedom of service under one service subscription and telephone number as well as under a plurality of subscriptions and telephone numbers.

SUMMARY OF THE INVENTION

The present invention provides a method and apparatus for automatically tailoring a communication device to suit the user's preferences based on the user's identity. The communication device stores a plurality reference signatures and associated operational profiles. An end user supplies a proffered signature to the communication device. The proffered signature is compared to the stored reference signatures. If a match is found, the communication device is configured according to the operational profile associated with the matched reference signature. If no match is found, normal operation of the communication device is preferably inhibited. The proffered and reference signatures may be conventional passwords, spoken voice patterns, writing samples, fingerprints, and the like. The operational profile may include subscriber account information, voice recognition parameters, and the user's speed-dial list. The present invention allows a single apparatus to be used by a plurality of end users under one service subscription and telephone number as well as under a plurality of subscriptions and telephone numbers.

DETAILED DESCRIPTION

The present invention identifies the end user (or simply "user") of the communication device based on a signature associated with the user. Once the identity is established, the communication device adapts its operational characteristics according to stored settings associated with the user identity.

Figure 1:
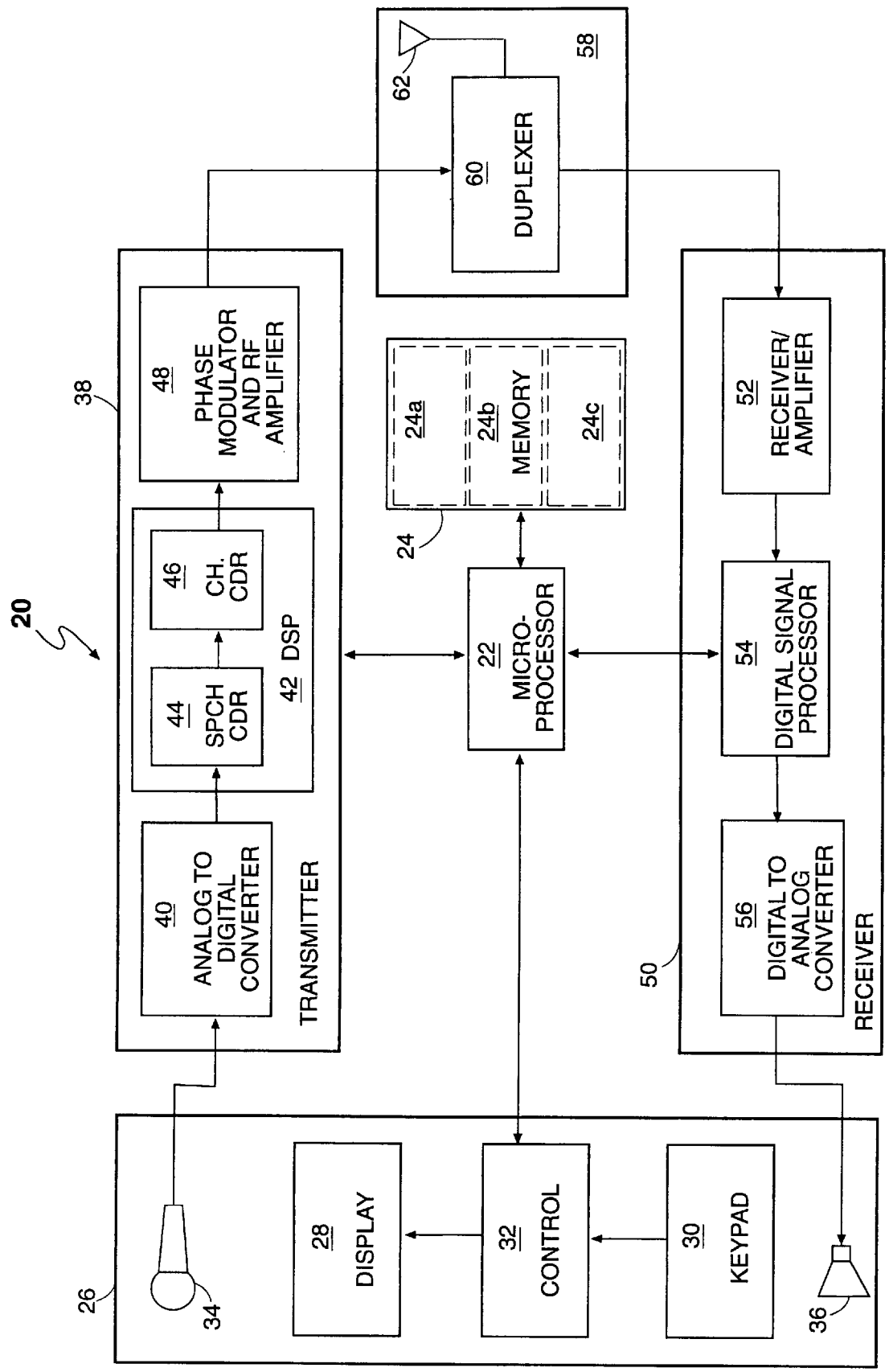
FIG. 1 is a block diagram of a typical communication device of the present invention.

FIG. 1 is a general block diagram of one preferred embodiment of a communication device according to the present invention. For clarity of illustration, a cellular telephone capable of transmitting and receiving digital signals will be used as an example of a communication device in the following discussion.

FIG. 1 is a block diagram of a typical telephone 20 suitable for the present invention. The telephone 20 includes a microprocessor 22, an operator interface 26, a transmitter 38, a receiver 50, and an antenna assembly 58.

The operator interface 26 typically includes a display 28, keypad 30, control unit 32, microphone 34, and speaker 36. The display 28 allows the operator to see dialed digits, call status, and other service information. The keypad 30 allows the operator to dial numbers, enter commands, and select options. The control unit 32 interfaces the display 28 and keypad 30 with the microprocessor 22. The microphone 34 receives acoustic signals from the user and converts the acoustic signals to an analog electrical signal. Speaker 36 converts that analog electrical signal from the receiver 50 to an acoustic signal which can be heard by the user.

The analog electrical signal from the microphone 34 is supplied to the transmitter 38. The transmitter 38 includes an analog to digital converter 40, a digital signal processor 42, and a phase modulator and RF amplifier 48. The analog to digital converter 40 changes the analog electrical signal from the microphone 34 into a digital signal. The digital signal is passed to the digital signal processor (DSP) 42 which contains a speech coder 44 and channel coder 46. The speech coder 44 compresses the digital signal and the channel coder 46 inserts error detection, error correction and signaling information. The DSP 42 may include, or may work in conjunction with, a DTMF tone generator (not shown). The compressed and encoded signal from the digital signal processor 42 is passed to the phase modulator and RF amplifier 48 which are shown as a combined unit in FIG. 1. The modulator converts the signal to a form which is suitable for transmission on an RF carrier. The RF amplifier then boosts the output of the modulator for transmission via the antenna assembly 58.

The receiver 50 includes a receiver/amplifier 52, digital signal processor 54, and a digital to analog converter 56. Signals received by the antenna assembly 58 are passed to the receiver/amplifier 52 which shifts the frequency spectrum and boosts the low level RF signal to a level appropriate for input to the digital signal processor 54.

The digital signal processor 54 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data is passed to the microprocessor 22. Speech data is processed by a speech decoder and passed to the digital to analog converter 56. The digital signal processor 54, may include, or may work in conjunction with, a DTMF tone detector (not shown).

The digital to analog converter 56 converts the speech data into an analog signal which is applied to the speaker 36 to generate acoustic signals which can be heard by the user.

The antenna assembly 58 is connected to the RF amplifier of the transmitter 38 and to the receiver/amplifier 52 of the receiver 50. The antenna assembly 58 typically includes a duplexer 60 and an antenna 62. The duplexer 60 permits full duplex communications over the antenna 62, as may be required for analog or dual-mode operation.

The microprocessor 22 coordinates the operation of the transmitter 38 and the receiver 50. This coordination includes power control, channel selection, timing, as well as a host of other functions. The microprocessor 22 inserts signaling messages into the transmitted signals and extracts signaling messages from the received signals. The microprocessor 22 responds to any base station commands contained in the signaling messages, and implements those commands. When the user enters commands via the keypad 30, the commands are transferred to the microprocessor 22 for action. Memory 24 stores and supplies information at the direction of the microprocessor 22 and preferably includes both volatile and non-volatile portions.

The telephone's memory 24 is shown as comprising three distinct conceptual modules: random-access memory (RAM) 24a, read-only memory (ROM) 24b, and nonvolatile memory 24c. The first two of these, RAM 24a and ROM 24b, are those typically found in today's telephones, and perform essential functions unrelated to the present invention. As known in the industry, RAM 24a and ROM 24b may include a portion of nonvolatile memory for storing user-selected options provided by today's telephones.

Figure 2:
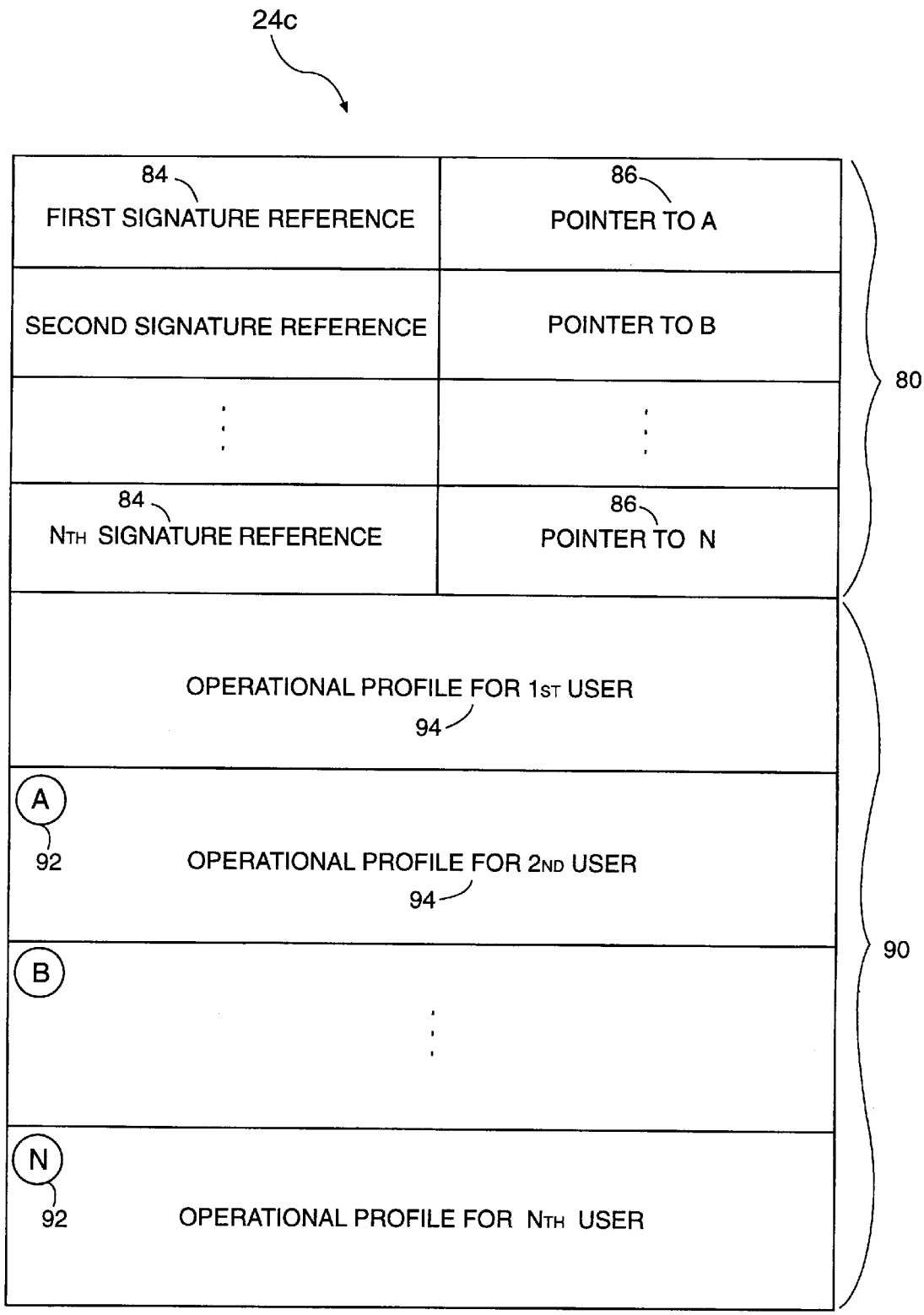
FIG. 2 is a simplified representation of one memory structure suitable for the present invention.

The arrangement of the third conceptual module, non-volatile memory 24c in one preferred embodiment, is shown in finer detail in FIG. 2. This nonvolatile memory 24c stores a list of reference signatures and associated pointers 80 and a set of user operational profiles 90. The term "reference signatures" is used herein to indicate not only what is commonly referred to as passwords (manually entered sequences such as multi-digit alphanumeric codes), but also spoken passwords, writing samples, fingerprints, and any other known method of identifying a particular user.

A telephone according to the present invention supports a plurality of reference signatures 84. Each reference signature 84 is associated with a pointer 86, and each pointer 86 identifies the memory location 92 of an operational profile 94 associated with its corresponding reference signature 84. Thus, each reference signature 84 can be associated with two items: (1) the identity of a distinct and particular user, and (2) an operational profile 94 tailored to the preferences of that particular user. Preferably, only one user knows the reference signature 84 and the associated operational profile 94 is not revealed to users other than that particular user.

Operational profiles 94 may include a wide variety of user specific configuration settings for the telephone and related information. For example, an operational profile 94 may include speech recognition parameters, a plurality of telephone books, and account information. These operational profile parameters are for purposes of illustration only; none is essential to the spirit of the invention. The account information, if present, could optionally provide for a plurality of mobile identification numbers if desired, thereby supporting a plurality of subscriber accounts rather than the preferred embodiment's one account. Further, billing information could be retained within each profile, for purposes of allocating service charges over a plurality of users of one subscriber account or multiple subscriber accounts, or for bill-back to users based on activity level.

Figure 4:
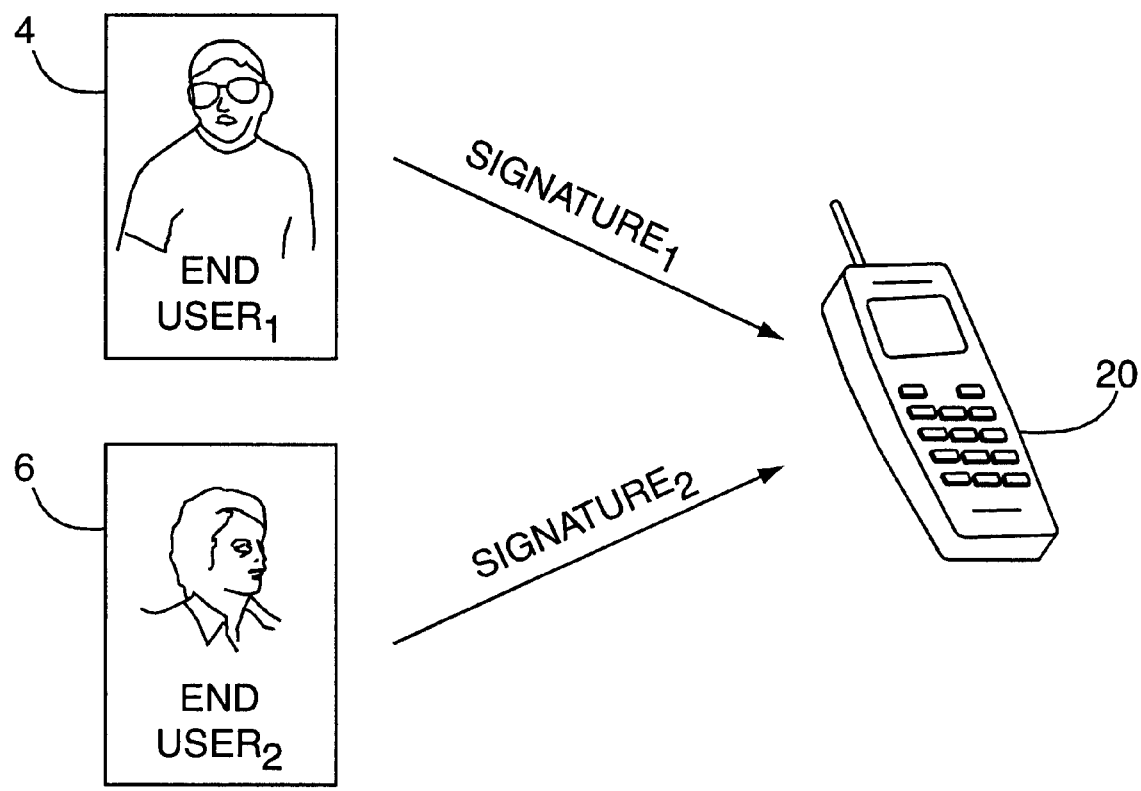
FIG. 4 represents the use of the communication device of FIG. 1 by a first end user and then a second end user.

As shown in FIG. 4, the telephone 20 of FIG. 1 may be sequentially configured to suit the preferences of a plurality of end users, such as a first end user 4 and a second end user 6 based on the identity thereof, as discussed below. As discussed above, the first end user 4 and the second end user 6 may share a single service subscription to a common-carrier telecommunication service, or may have separate service subscriptions.

Figure 3:
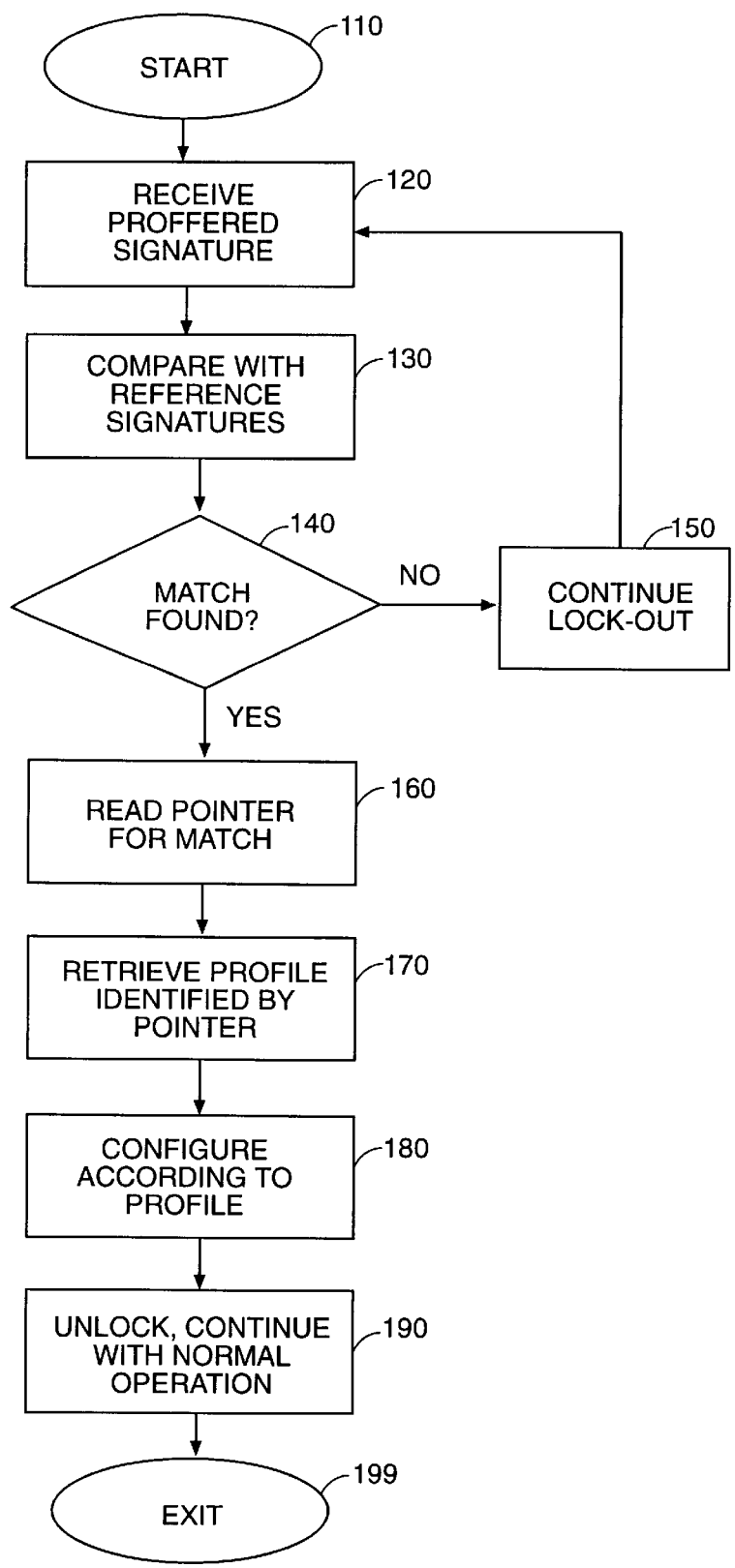
FIG. 3 is a flow diagram of one preferred embodiment of the present invention.

A process of the present invention is shown in FIG. 3. At the start of the process (box 110), normal operation of the telephone is preferably locked-out. To gain operational access to the telephone, a prospective user enters a signature (box 120) (see also FIG. 4). As described above, this can be done in a wide variety of ways. For instance, the user may manually enter a password via the keypad (perhaps in response to a prompt), the user may speak a password in response to a prompt, or a user may have a fingerprint or equivalent scanned. For clarity, this signature will be referred to as the proffered signature.

Logic within the telephone, such as the microprocessor 22, checks this entry against the list of reference signatures (box 130). Preferably, this list contains a plurality of reference signatures 84, as shown in FIG. 2, and the proffered signature is compared against all of the reference signatures 84 until a match is found or the list is exhausted (box 140). The term "match" does not mean that the proffered signature must be exactly the same as the reference signature 84. For instance, it is known in voice recognition art to allow for variation between the proffered voiceprint signature and the reference signature voiceprint within pre-established limits. It is believed that fingerprint comparisons use a similar approach. On the other hand, manually entered passwords are typically required to be exact duplicates of the reference, or stored, password. Thus, the degree of similarity between the proffered signature and the reference signature 84 may vary depending on the technology employed and the amount of security desired. Accordingly, the term "match" is broader than "exact match" and means "is similar to within a predetermined variation." If the proffered signature matches none of the reference signatures 84 (box 140), the user continues to be locked out (box 150). If, however, the proffered signature matches one of the reference signatures 84 (box 140), the corresponding pointer 86 is read (box 160). The pointer 86 points to a location 92 within the nonvolatile memory 24c where the operational profile 94 may be found that corresponds to the now matched reference signature 84. By means of the pointer, the telephone recalls from nonvolatile memory 24c the operational profile 94 associated with the signature (box 170) (and therefore associated with the identity of the user) and configures itself accordingly (box 180). Thereafter, the normal operation of the telephone is enabled (box 190) and the process is exited (box 199).

As discussed above, the present invention encompasses embodiments wherein the user provides a proffered signature of some kind other than a manually entered password. Examples of such proffered signatures include spoken passwords (i.e., unlocking based on speaker identification); fingerprints; retina scans; or proffered signatures particularly applicable to phones integrated into vehicles such as a sequence of digits manually entered into a cipher lock affixed to a vehicle's door handle or other means associated with a vehicle's memory package that is used to control such options as mirror positions and power-seat settings; and the like.

Moreover, the present invention is not limited to handheld cellular telephones, but also covers other kinds of radiotelephones such as satellite telephones and privatesystem telephones as well as marine, maritime, and aviation telephones, as well as fixed line (SLT and MLT) telephones and fixed-line pay telephones.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method for adapting the operation of a communication device based on the identity of its user, comprising:
    a) storing a first reference signature associated with a first end user of the communication device;
    b) storing a second reference signature associated with a second end user of the communication device;
    c) storing a first operational profile associated with said first end user;
    d) while said first operational profile is stored, storing a second operational profile associated with said second end user;
    e) receiving a proffered signature from an end user;
    f) retrieving said first operational profile and configuring the communication device according to said first operational profile in response to said receiving said proffered signature if said proffered signature matches said first reference signature;
    g) retrieving said second operational profile and configuring the communication device according to said second operational profile in response to said receiving said proffered signature if said proffered signature matches said second reference signature.

2. The method of claim 1 wherein said proffered signature and said first reference signature are passwords.

3. The method of claim 1 wherein at least one of said first operational profile and said second operational profile includes voice recognition parameters.

4. The method of claim 1 wherein at least one of said first operational profile and said second operational profile includes subscriber account information.

5. The method of claim 1 wherein at least one of said first operational profile and said second operational profile includes a mobile identification number.

6. The method of claim 1 wherein said communication device is a cellular telephone.

7. The method of claim 1 wherein said communication device is structurally integrated with a motor vehicle.

8. The method of claim 1 wherein said first end user and said second end user share a subscription to a common-carrier telecommunication service associated with said communication device.

9. A method for adapting the operation of a communication device based on the identity of its user, comprising:
   a) storing a list of a plurality of reference signatures associated with a plurality of end users of the communication device;
   b) storing at least one operational profile for the communication device; each of said operational profiles having at least one reference signature associated therewith;
   c) receiving a proffered signature from an end user;
   d) comparing said proffered signature to said reference signatures on said list until either:
      i) a match is found; or
      ii) the list is exhausted;
   e) thereafter retrieving said operational profile and configuring the communication device according to said operational profile in response to said receiving said proffered signature if said proffered signature matches any of said reference signatures on said list.

10. The method of claim 9 wherein said proffered signature and said reference signature are passwords.

11. The method of claim 9 wherein said operational profile includes voice recognition parameters.

12. The method of claim 9 wherein said operational profile includes subscriber account information.

13. The method of claim 9 wherein said communication device operates as part of a common-carrier telecommunication service.

14. The method of claim 9 wherein said communication device is a cellular telephone.

15. A method for adapting the operation of a communication device based on the identity of its user, comprising:
   a) storing a plurality of reference signatures including a first reference signature associated with a first end user and a second reference signature associated with a second end user;
   b) storing a plurality of operational profiles of operational characteristics for the communication device; each of said operational profiles having at least one reference signature associated therewith;
   c) receiving a proffered signature from an end user;
   d) comparing said proffered signature to one or more of said reference signatures to identify a matched reference signature;
   e) if said proffered signature matches any of said reference signatures, retrieving said operational profile associated with said matched reference signature;
   f) configuring the communication device according to said retrieved operational profile in response to said receiving said proffered signature;
   g) wherein the communication device performs
      i) said storing of a plurality of reference signatures;
      ii) said storing of a plurality of operational profiles;
      iii) said comparing; and
      iv) said retrieving.

16. The method of claim 15 wherein said proffered signature and said reference signature are manually entered passwords.

17. The method of claim 15 wherein said operational profile includes subscriber account information.

18. The method of claim 15 wherein said operational profile includes voice recognition parameters.

19. The method of claim 15 wherein said communication device is a cellular telephone.

20. The method of claim 15 wherein said first end user and said second end user share a subscription to a common-carrier telecommunication service associated with said communication device.

21. A communication device that adapts its operation based on the identity of its user, comprising:
   a) a radio transceiver;
   b) a logic circuit associated with said radio transceiver;
   c) a first operational profile for said transceiver associated with a first end user and having a first reference signature associated therewith;
   d) a second operational profile for said transceiver associated with a second end user and having a second reference signature associated therewith;
   e) a signature input in communication with said logic circuit;
   f) wherein when a user inputs a proffered signature at said signature input, said logic circuit causes said radio transceiver to operate either
      i) according to said first operational profile if said proffered signature matches said first reference signature;
      ii) or according to said second operational profile if said proffered signature matches said second reference signature.

22. The communication device of claim 21 wherein said radio transceiver operates as part of a common-carrier telecommunication service.

23. The communication device of claim 21 wherein said first end user and said second end user share a subscription to telecommunication service associated with said communication device.

24. The communication device of claim 21 wherein said proffered signature and said first reference signature are passwords.

25. The communication device of claim 21 wherein at least one of said first operational profile and said second operational profile includes voice recognition parameters.

26. The communication device of claim 21 wherein at least one of said first operational profile and said second operational profile includes subscriber account information.

27. The communication device of claim 21 wherein at least one of said first operational profile and said second operational profile includes a mobile identification number.

28. The communication device of claim 21 wherein said communication device is a cellular telephone.

29. The communication device of claim 21 wherein said communication device is structurally integrated with a motor vehicle.

30. The communication device of claim 29 wherein said first end user and said second end user share a subscription to a common-carrier telecommunication service associated with said communication device.

* * * * *